United States Patent [19]

Butter et al.

[11] Patent Number: 5,390,424
[45] Date of Patent: Feb. 21, 1995

[54] ANALOGUE PROBE

[75] Inventors: Andrew G. Butter; Adrian C. Welsford; David G. Powley, all of Bristol; David R. McMurtry, Wotton-Under-Edge, all of United Kingdom

[73] Assignee: Renishaw Metrology Limited, Gloucestershire, United Kingdom

[21] Appl. No.: 34,770

[22] Filed: Mar. 19, 1993

Related U.S. Application Data

[63] Continuation-in-part of Ser. No. 643,373, Jan. 22, 1991, Pat. No. 5,212,873.

[30] Foreign Application Priority Data

Jan. 25, 1990 [GB] United Kingdom ............... 9001682

[51] Int. Cl.⁶ .................................. G01B 5/20
[52] U.S. Cl. ..................... 33/561; 33/558; 33/707
[58] Field of Search ............... 33/559, 561, 556, 558, 33/707; 73/865.8; 356/374

[56] References Cited

U.S. PATENT DOCUMENTS

| | | |
|---|---|---|
| 3,869,799 | 3/1975 | Neuer et al. . |
| 3,957,378 | 5/1976 | Zipin .................... 356/374 |
| 4,084,323 | 4/1978 | McMurtry ............... 33/561 |
| 4,158,919 | 6/1979 | McMurtry . |
| 4,523,382 | 6/1985 | Werner et al. . |
| 4,523,383 | 6/1985 | Rogers et al. . |
| 4,530,159 | 7/1985 | Ernst ..................... 33/558 |
| 4,578,873 | 4/1986 | Klingler et al. . |
| 4,611,403 | 9/1986 | Morita et al. ............. 33/561 |
| 4,716,656 | 1/1988 | Maddock et al. .......... 33/561 |
| 4,899,456 | 2/1990 | Morita et al. . |
| 4,937,948 | 7/1990 | Herzon et al. ............ 33/561 |
| 4,942,671 | 7/1990 | Enderle et al. . |
| 5,048,194 | 9/1991 | McMurtry ............... 33/561 |
| 5,083,379 | 1/1992 | Enderle et al. ........... 33/556 |
| 5,212,873 | 5/1993 | McMurtry ............... 33/561 |

FOREIGN PATENT DOCUMENTS

| | | |
|---|---|---|
| 0284737 | 10/1988 | European Pat. Off. . |
| 0392699 | 10/1990 | European Pat. Off. . |
| 0422530 | 4/1991 | European Pat. Off. . |
| 3234471 | 8/1983 | Germany . |
| 58-189501 | 5/1983 | Japan . |
| 58-060202 | 9/1983 | Japan . |
| 60-040903 | 4/1985 | Japan . |
| 2112139 | 7/1983 | United Kingdom . |
| 2163256 | 2/1986 | United Kingdom . |
| 8400605 | 2/1984 | WIPO . |
| 9004149 | 4/1990 | WIPO . |

Primary Examiner—Thomas B. Will
Attorney, Agent, or Firm—Oliff & Berridge

[57] ABSTRACT

An analogue probe has a fixed structure and a stylus supporting member connected to the fixed structure by three serially mounted pairs of leaf springs interconnected by first and second intermediate members. The stylus supporting member supports an elongate stem upon which a cube, which supports three scales, is mounted. Readheads are mounted on the fixed structure, in register with the scales, to transduce movement of the stylus supporting member in three substantially orthogonal directions. The alignment of the scales about the yaw axis (extending in a direction perpendicular to the plane of the scale) determines the alignment of the measuring axes of the probe, while the straightness of the lines of the scales determines the straightness of the axes.

4 Claims, 7 Drawing Sheets

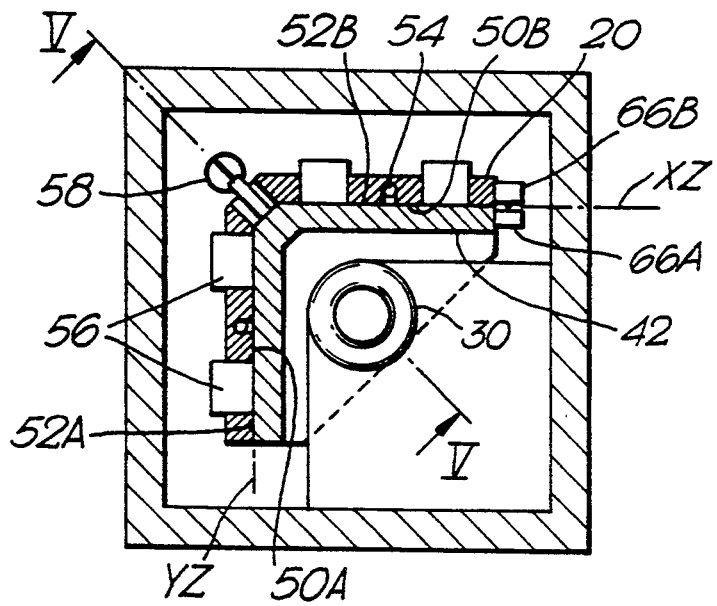
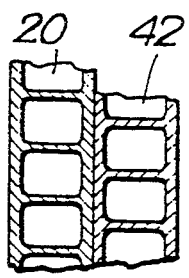
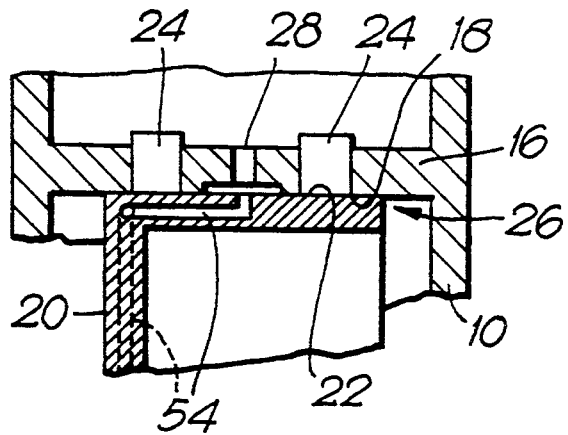
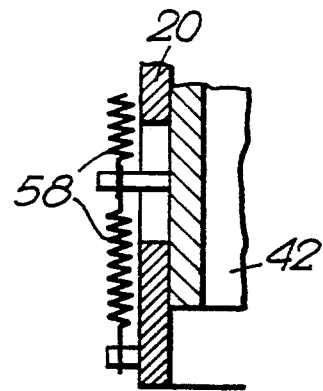

5,390,424

ANALOGUE PROBE

This is a continuation-in-part of application Ser. No. 07/643,373, filed Jan. 22, 1991, now U.S. Pat. No. 5,212,873.

BACKGROUND TO THE INVENTION

1. Field of the Invention

This invention relates to an analogue, scanning or measurement probe used on a coordinate positioning machine such as a coordinate measuring machine or machine tool, to measure the position or contour of a surface.

Coordinate positioning machines are known to include an arm supported for movement in mutually perpendicular directions relative to a table on which a workpiece is supportable, and transducers for measuring the position of the arm relative to a reference position or datum on the table. A probe typically comprises a fixed structure such as a housing, a stylus supported on a support assembly for 3-dimensional movement relative to the fixed structure, and transducers for measuring the position of the stylus relative to a reference position on the fixed structure.

In use the fixed structure of the probe is secured to the arm of the machine and, in a typical operation, the arm is moved to a predetermined position in which the stylus engages a point on the workpiece where, as a result it is displaced relative to the fixed structure. The sum of the outputs of the respective transducers defines the position of the stylus relative to the datum.

The present invention relates to the type of transducers employed in an analogue probe.

2. Description of Related Art

It is known from U.S. Pat. No. 4,084,323 to provide an analogue probe having a stylus supported relative to a fixed structure by three serially connected parallel springs. Displacement of the stylus relative to the fixed structure is transduced by means of three proximity sensors, mounted on the fixed structure in register with three faces of a cubic iron mass which is mounted to the stylus.

SUMMARY OF THE INVENTION

The present invention provides a probe for use on a coordinate positioning machine in measuring the position or contours of a surface comprising a fixed structure, by which the probe is connectable to a movable arm of the machine, and a stylus supporting member movable relative to the fixed structure in at least two dimensions, the probe further comprising transducer means for transducing movement of said supporting member relative to the fixed structure in two non-parallel directions, said transducer means comprising a first and a second scale each provided on one of the fixed structure and movable member, said first and second scales having lines extending in non-parallel directions, and means provided on the other of the fixed structure and movable member for reading each of said scales in a direction perpendicular to the lines of each said scale.

Preferably the scales are provided on the movable member. The relative alignment of the lines of the different scales thus determines the squareness of the probe axes, while the straightness of the axes is determined by the lines of the individual scales.

BRIEF DESCRIPTION OF DRAWINGS

Embodiments of the invention will now be described by way of example, and with reference to the accompanying drawings wherein:

FIG. 3 is a section on the line III—III in FIG. 1,
FIG. 4 is a section on the line IV—IV in FIG. 2,
FIG. 5 is a section on the line V—V in FIG. 3,
FIG. 6 is an enlarged sectional detail of FIG. 1.

DESCRIPTION OF PREFERRED EMBODIMENTS

Figure 1:
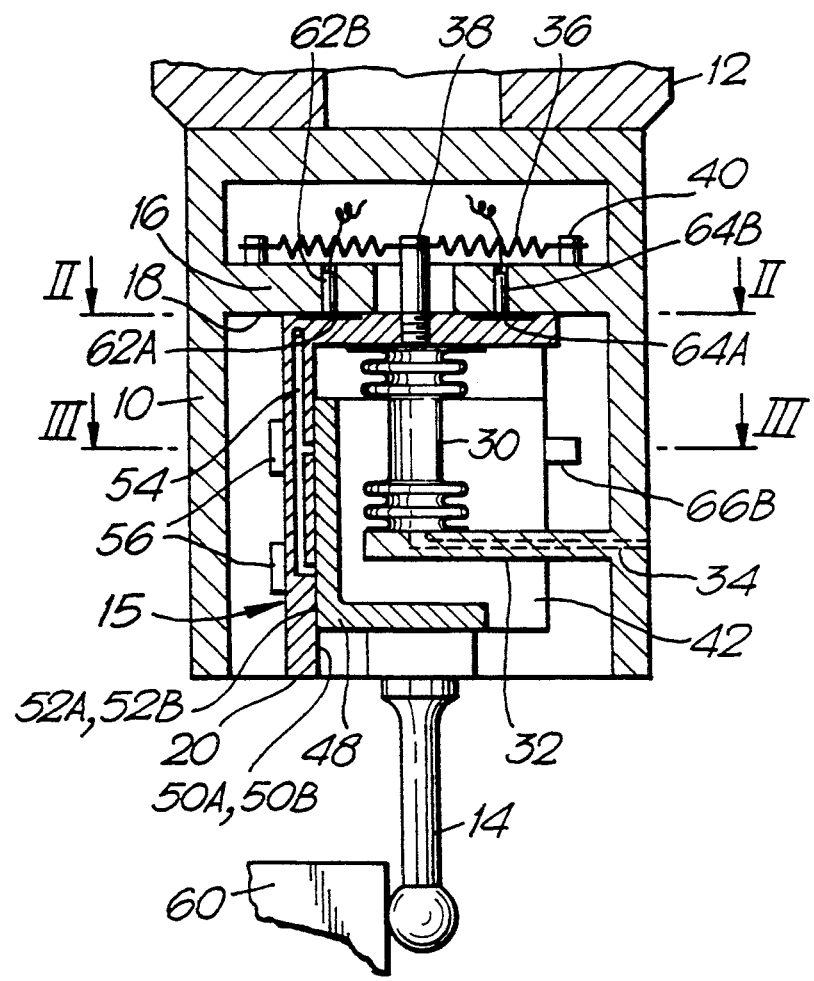
FIG. 1 is a sectional elevation of a first embodiment of a probe.
Figure 2:
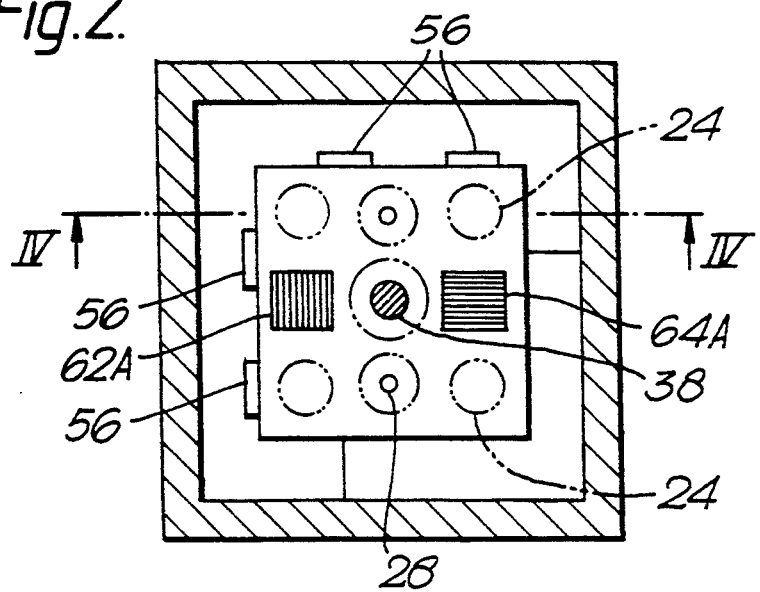
FIG. 2 is a section on the line II—II in FIG. 1.

The probe is described with reference to mutually perpendicular directions X,Y,Z. The probe has a fixed structure, provided by a housing 10, and connectable to the head 12 of a machine. A stylus 14, is supported by an assembly 15 which permits movement of the stylus relative to the housing 12 in each of the X,Y and Z directions. Specifically, the stylus-supporting assembly 15 comprises a first member 16, fixedly connected to the housing 10, and having a plane surface 18 extending in the XY plane. A second member 20, having a plane surface 22, is retained against the first member 16 by a pair of Samarium Cobalt magnets 24 which act either on the second member (if it is of ferromagnetic material) or on ferromagnetic elements on the second member. The second member 20 is supported for motion relative to the first member in all directions in XY plane by means of an air bearing 26 (FIG. 4) formed between the adjacent plane surfaces 18 and 22 of the first and second members 16 and 20. The air bearing is fed with compressed air through a supply duct 28. Further, the second member 20 is supported against rotation relative to the first member 16 by a spring bellows 30 (FIG. 1) connected between the second member 20 and a flange 32 provided on the housing 12. The bellows 30 may also be used to bias the second member 20 against, and into a rest position relative to (with respect to the X and Y directions) the first member 16. To this end the bellows 30 may be supplied with compressed air via a duct 34. Bias into the rest position of the second member is also assisted by tension springs 36 connected between a post 38 secured to the second member 20 and posts 40 on the first member 16.

The second member 20 is adapted to support a third member 42 (to which the stylus is connectable) for movement in the Z direction by an air bearing 48 formed between adjacent plane surfaces 50A,B and 52A,B of the second and third members 20,42. The air bearing 48 is fed with compressed air through channels 54, provided in the body of the second member 20 and connected to the air bearing 26. The air bearings 26 and 48 are thus supplied from the same duct 28. This arrangement obviates the need for example for air-pipe connections between the housing 12 and second member 20 which due to their stiffness would restrict movement of the second member 20. The surfaces 52A,B of the third member 42 are held against the surfaces 50A,B of the second member 20 by Samarium Cobalt magnets 56 located in the second member 20, and the third member 42 is supported against rotation about the Z direction by the surfaces 50A and 52A being arranged to extend in an XZ plane and the surfaces 50B and 52B to extend in the YZ plane as shown in FIG. 3. The third member 42 is biased into a rest position with respect to the Z direction by a pair of opposing springs 58 (FIGS. 3,5) connected between the members 20 and 42. The third member 42 is adapted to have the stylus 14 secured thereto.

In operation, the head 12 is moved relative to the workpiece so as to engage the free end of the stylus 14 with a workpiece 60 and displace the stylus 14 from its rest position by an amount within the range of movement of the members 20,42 relative to the members 16,20, respectively. The displacement of the stylus 14 from its rest position in the X,Y or Z directions is measurable by opto-electronic transducers 62,64,66 respectively. The transducer 62 comprises a scale 62A and a readhead 62B mounted respectively on the members 20 and 16. The transducer 64 has a correspondingly mounted scale 64A and readhead 64B wherein the lines of the scale 62A are spaced in the X direction while the lines of the scale 64A are spaced in the Y direction for measuring of the stylus displacement in these two directions. The transducer 66 has a scale 66A and a readhead 66B mounted respectively on the member 20 and 42 for measuring displacement of stylus 14 in the Z-direction.

From the point of view of the control system of the machine, it is desirable that the masses of the second and third members 20,42 should be low and that the masses that need to be moved in any of the three dimensions should be as nearly as possible the same. It will be seen that, in the probe illustrated, the masses to be moved in the X and Y directions are the same, i.e. are constituted by the members 20 and 42. Regarding the Z direction, which involves only the member 42, the mass of this member is necessarily less than that of the combined masses of both the members 20,42 involved in the X,Y motion. However, the member 20 may be made of a lighter material than the member 42 so that the combined mass of the members 20,42 is not substantially greater than the mass of the member 42. Alternatively, both members 20,42 may be made of very light material so that their combined or separate masses do not show a substantial difference as far as the control system of the machine is concerned. An example of a light material is the honeycomb material shown in FIG. 6 which provides a light but stiff structure. Such material is preferably made of steel or other material (e.g. ceramics) having the ability to provide the hard and smooth surface finish necessary for the air bearings.

The air bearings 26,48 represent a means for virtually frictionless support for the movable parts 20,42. As shown at 28 in FIG. 4, the entry of the compressed air into the bearings 26,48 is via the first member 16 so that no tubes are necessary between relatively movable parts and hysteresis due to such tubes is avoided. As an alternative to the air supply being brought to the bearings 26,48 via ducts 28 and 54 respectively the supply may be provided, via the bellows 30 (the air being fed to the bearings 26,48) from the upper or movable end of the bellows 30).

As shown in FIG. 1, the readheads are mounted on the first member 16 so that no cables are necessary between the relatively movable first and second members 16,20. In the example illustrated, the readhead 66B (FIGS. 1,3) is mounted on the second member 20 but any cables to this readhead can be brought away from the member 20 via the post 38 and the springs 36.

It is however possible, to mount all three transducer readheads on the housing 10, by providing the scale 66A on the interior of third member 42, and readhead 66B in register with the scale on the end of flange 32.

The bearings 26 and 48 are shown as air bearings, preferred because of the exceedingly low friction afforded by such bearings. The bearings may however be provided by other means such as, for example, oil bearings, thin layers of PTFE on the surfaces 18 and 22 (such layers should be sufficiently stiff to retain a desired degree of stiffness between the surfaces 18 and 22), or ball bearings provided between the surface 18 and 22. Where ball bearings are used the balls may be either free standing, with e.g. a diaphragm provided at the edges of the surfaces 18 and 22, or trapped in a cage.

In the illustrated embodiments, the first member 16 is fixedly connected to the housing 10, and Z-axis movement of the stylus is provided by the third member 42 being movable relative to the second member 20 in the Z direction. It is however possible to mount the first member 16 for movement relative to the housing 10 (in e.g. the X direction) for example in a manner similar to the mounting of the third member 42 on the second member 20. In this case, the first plane surface 18 of the first member 16 would extend in the YZ plane and the second member 20 would be free to move relative to the first member 16 in all directions in this plane.

Figure 7:
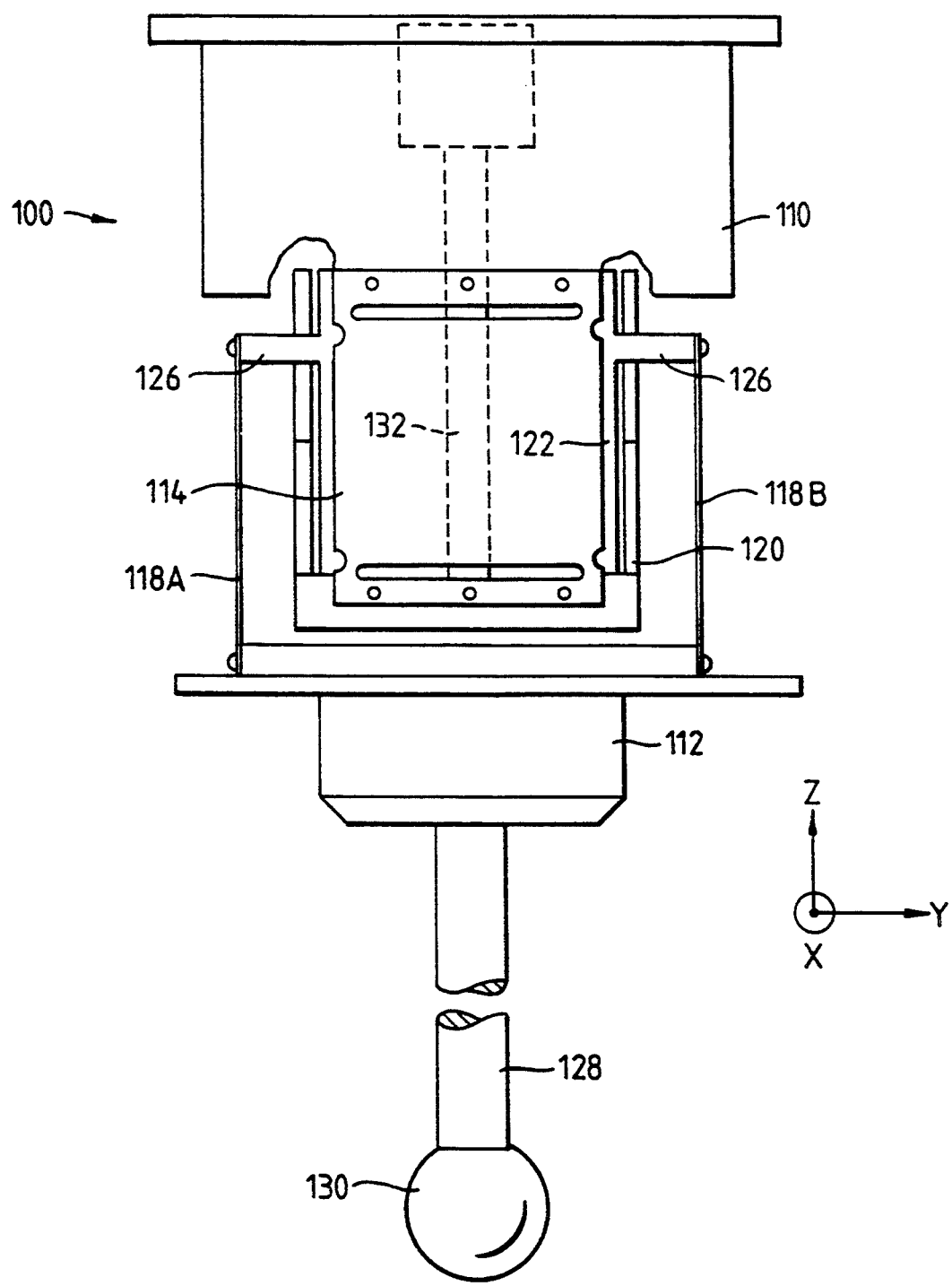
FIG. 7 is a section through a second embodiment of the probe according to the invention.
Figure 8:
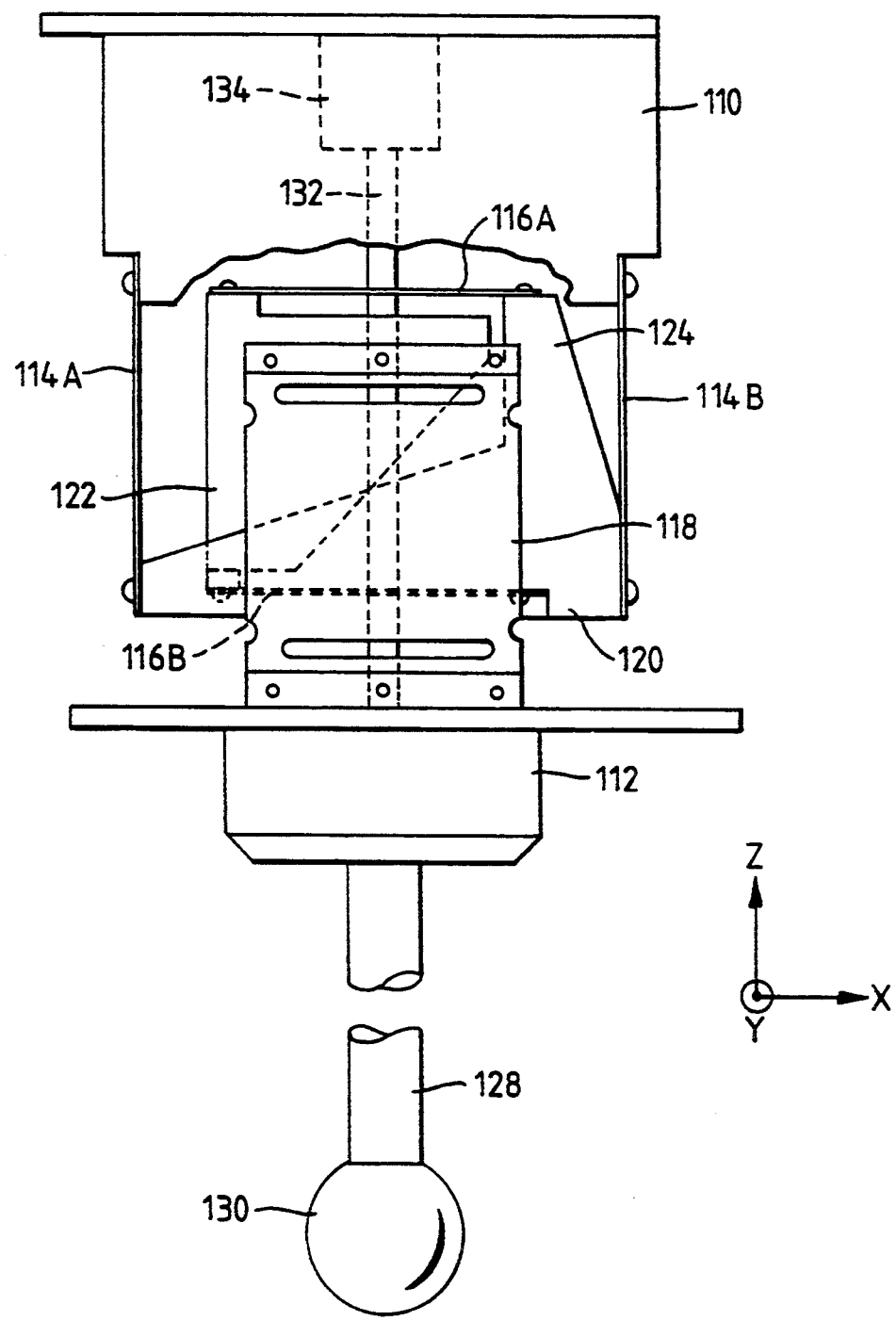
FIG. 8 is a section of the embodiment of FIG. 7 as viewed along the Y-axis.

A second embodiment of probe will now be described with reference to FIG. 7. A probe 100 has a fixed structure 110, and a stylus supporting member 112 suspended relative to the fixed structure 110 by three serially connected pairs of leaf springs 114,116,118. The pairs of leaf springs 114,116,118 permit translations of the stylus supporting member 112 relative to the fixed structure 110 in the X,Z, and Y directions respectively, thus providing three translational degrees of freedom for the stylus supporting member 112; the pairs of leaf springs 114,116,118 however act, to a first approximation, to prevent rotation of the supporting member 112 relative to the fixed structure 110. The leaf springs 114,116 are interconnected by a first intermediate member 120 and the leaf springs 116,118 are interconnected by a second intermediate member 122. Referring now to FIGS. 7 and 8, leaf springs 114A,B, spaced apart in the X direction and extending in substantially parallel YZ planes, are connected at their upper end to the fixed structure 110, and at their lower end to the first intermediate member 120. The intermediate member 120 is thus constrained by the leaf springs 114A,B to move relative to the fixed structure 110 only in the X direction. Leaf springs 116A,B are spaced apart in the Z direction and extend in parallel XY planes. Leaf spring 116A is connected at one end to an upwardly extending limb 124 on the first intermediate member 120, and at the other end to a second intermediate member 122. Leaf spring 116B is connected at one end to the first intermediate member 120 and at the other end to the second intermediate member 122. The second intermediate member 122 is thus constrained by leaf springs 116A,B to move relative to the first intermediate member 120 in the Z direction; however, by virtue of the freedom of the first intermediate member 120 to move in the X direction, the second intermediate member 122 has two translational degrees of freedom, one in the X direction and the other in the Z direction. The configuration of the first and second intermediate members 120,122 is such that the second intermediate member 122 is nested within the structure of the first intermediate member 120, as shown in FIG. 7. Leaf springs 118A,B, spaced apart in the Y direction and extending in parallel XZ planes are connected at their upper end to outwardly extending arms 126 provided on the second intermediate member 122, and at their lower end to the stylus supporting member 112. The stylus supporting member 112 is thus constrained to move relative to the second intermediate member 122 in the Y direction. However, by virtue of the interconnection of the second intermediate member 122 with the first intermediate member 120, and the interconnection of the first intermediate member 120 with the fixed structure 110 by pairs of leaf springs 116A,B and 114A,B respectively, the stylus supporting member 112 has three degrees of translational freedom relative to the fixed structure 110. The stylus supporting member 112 supports an elongate stylus 128 having a substantially spherical sensing tip 130 at its free end.

In use, the fixed structure 110 is mounted to the movable arm of a coordinate positioning machine, and the arm is driven until the sensing tip 130 of the stylus 128 comes into contact with a surface whose position or contour is to be measured. The leaf springs 114,116,118 and intermediate members 120,122 permit displacement of the stylus supporting member 112 (and thus the stylus 128) relative to the fixed structure 110 upon contact of the sensing tip 130 with the surface. Transducers within the probe measure this displacement relative to a reference position, or datum, on the fixed structure. The position of the surface is thus determined relative to a reference on the table of the machine by summing the transducer outputs of the machine, which measure the position of the movable arm relative to the reference on the table, with the outputs of the transducers in the probe, which measure the displacement of the sensing tip 130 relative to a reference on the fixed structure (and thus the movable arm).

Figure 9:
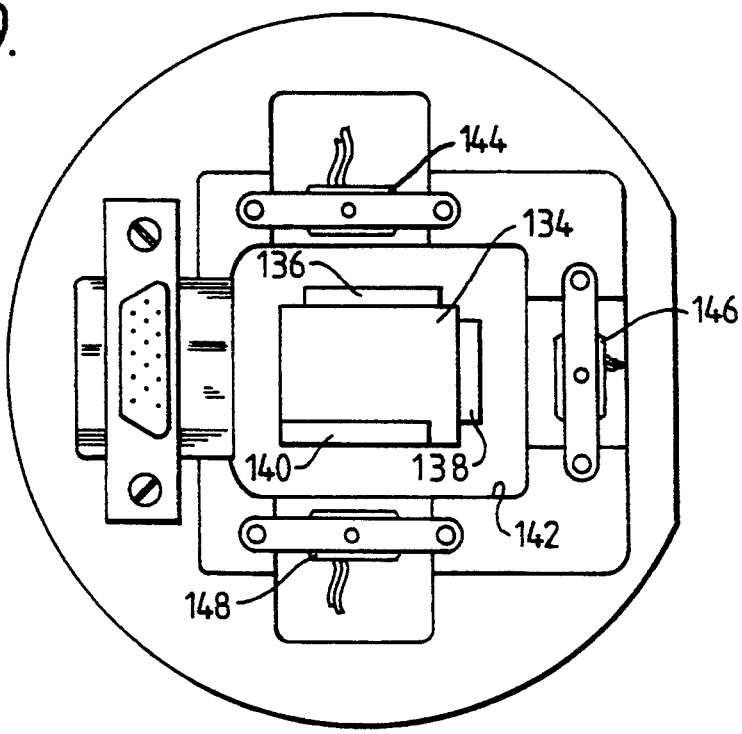
FIG. 9 is a plan view of the interior of the fixed structure in FIG. 8.

Referring now additionally to FIG. 9, the stylus supporting member 112 is connected to an elongate stem 132, which extends through apertures (not shown) in leaf springs 116A,B. The distal end of the stem 132 supports a cube 134 on which three scales 136,138,140 are mounted. The scales 136,138 have lines extending in the Z direction and are mounted in XZ and YZ planes respectively; the scale 140 has lines extending in the X direction and is mounted on the cube 134 in an XZ plane. The cube 134 thus moves within cavity 142, provided in the fixed structure 110, with movements which correspond exactly to the movements of the stylus supporting member 112, and to a first order approximation, the sensing tip 130 of the stylus 128.

Readheads 144,146,148 are mounted on the fixed structure 110 in register with the scales 136,138,140 respectively, and co-operate with the scales to measure displacement of the cube 134 within the cavity 142 in the X,Y and Z directions respectively. The readheads 144,146,148 detect any displacement of the scales 136,138,140 in a direction perpendicular to the spacing of the lines of each of the scales, but are insensitive to any movement of the scale either in a direction perpendicular to the plane of the scale, or along the direction of the lines of the scale. The alignment of the lines on the scale about an axis extending between the scale and the corresponding readhead thus determines the alignment of the measuring axes of the probe, whereas the straightness of the lines of each of the scales 136,138,140 determines the straightness of the measuring axes of the probe.

Figure 10:
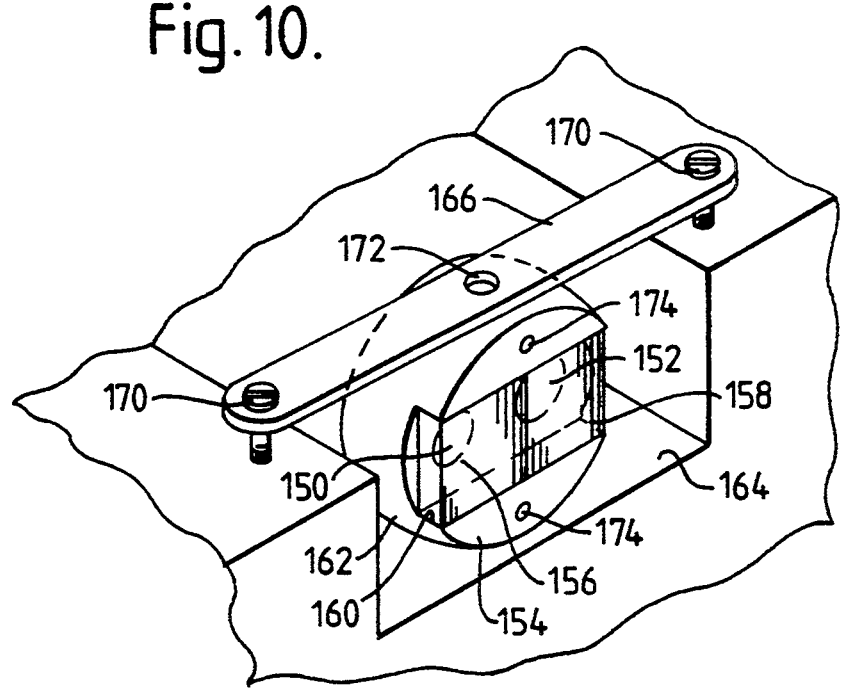
FIG. 10 is a detail of FIG. 9,
FIGS. 11A and 11B show a detail of FIGS. 7 and 8.

Referring now to FIG. 10, each of the readheads 144,146,148 includes a light source 150 and three detectors provided in a single unit 152, supported in a readhead housing 154. Light from the light source 150 passes through an index grating 156, is reflected off the scale, to pass into the detector unit 152 via an analyser grating 158. The index and analyser grating 156,158 are provided on a single glass substrate which is supported in a channel 160 provided in the readhead housing 154. The readhead housing 154 has an outer periphery 162 whose surface is spherical, and the readhead is retained in a channel 164 in the fixed structure 110. The readhead housing 154 is retained in the channel by means of a retention bar 166, which is secured to the fixed structure on either side of the channel by means of bolts 170. The retention bar 166 includes an aperture 172 which engages the spherical periphery of the readhead housing 154; a similar ,aperture (not shown) is provided in the base of the channel 164, and in register with the aperture 172. This arrangement enables adjustment of the attitude of the housing 154 relative to the adjacent scale on the cube 134, while the apertures which engage the periphery of the housing 154 prevent translation thereof. In this way, the pitch, roll and yaw of the housing about three perpendicular axes (all of which intersect at a common point coincident with the centre of the spherical periphery 162) may be adjusted to obtain optimum performance of the scale and readhead transducer. Adjustment of the housing position may be performed by a suitable tool having a pair of spaced-apart prongs each of which is engageable in a tooling hole 174. Pivoting of the tool while the prongs are engaged will thus rotate the housing 154 about the required axis. When the requisite alignment of the readhead and the scale has been obtained the bolts 170 may be tightened to such an extent that the friction between the retaining bar 166, the periphery 162 of the housing 154, and the base of the channel 164 is such that the housing cannot easily be moved.

As mentioned above, movements of the cube 134 relative to the fixed structure 110 correspond to a first order approximation to movements of the sensing tip 130 relative to the fixed structure 110. However, whenever the sensing tip 130 is displaced (e.g. by contact between the tip and a surface) the stylus 128 is subjected to a bending moment which will cause a minor deflection of the tip 130 relative to the stylus supporting member 112, and thus the cube 134. The magnitude of this deflection is proportional to the bending moment applied thereto, which is in turn proportional to the displacement of the sensing tip 130 from its rest position, i.e. the position which the sensing tip 130 occupies when no external force is applied thereto. In addition, the magnitude of deflection for a given bending moment is related to the length of the stylus. With relatively short styli therefore the deflections are too small to be significant within the context of the accuracies to which the probe is required to measure. However, bending deflection of the stylus effectively limits the maximum length of stylus which may be used with a probe before a significant degree of uncertainty is introduced into the measurement which the probe is required to make. An independent aspect of the present invention relates to a configuration of leaf spring suspension mechanism which ameliorates this problem.

Figure 11A:
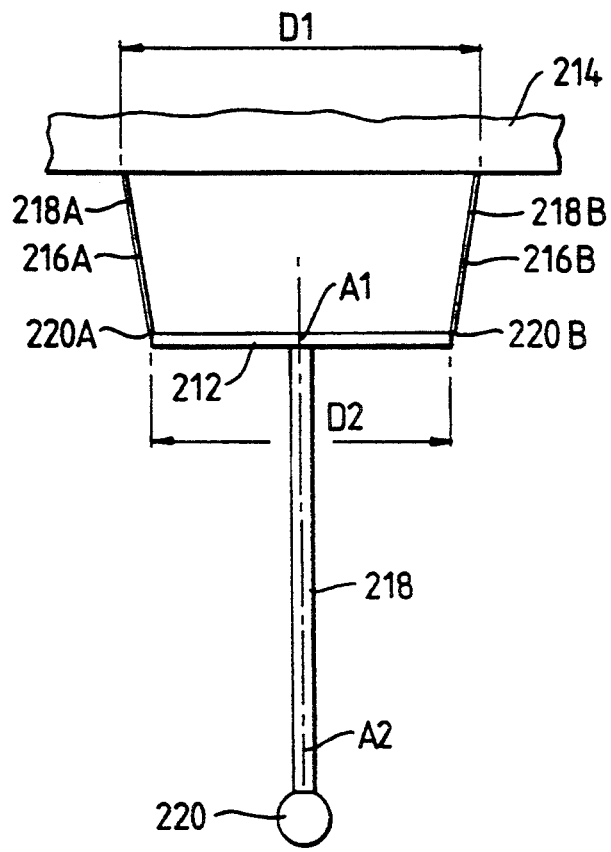
Figure 11B:
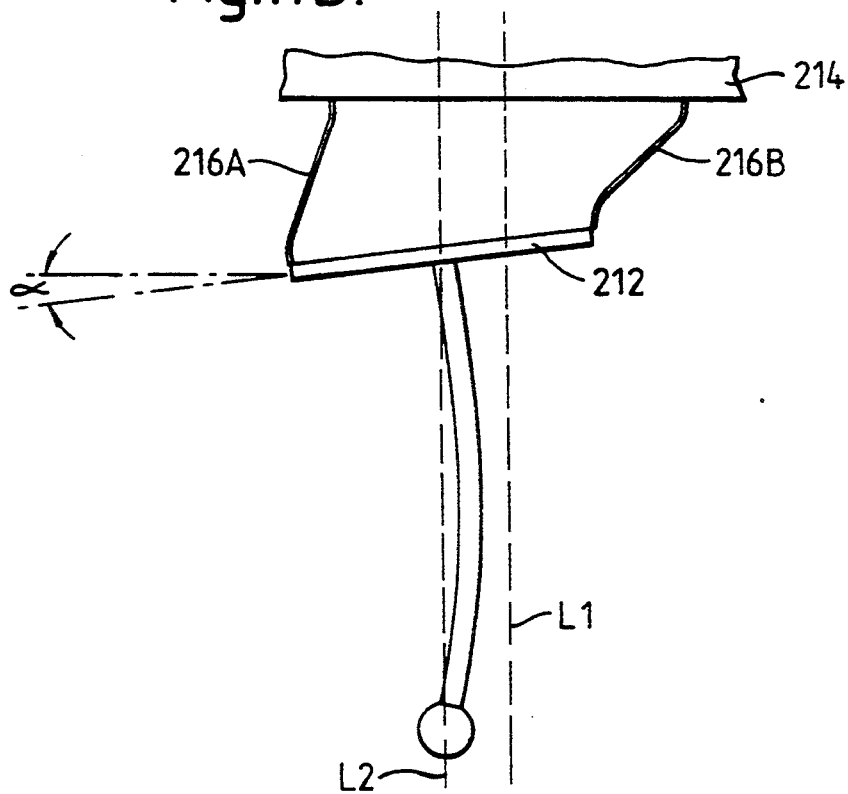

Referring now to FIGS. 11A and 11B, a stylus supporting member 212 is supported for movement in the X direction relative to a member 214 by a pair of leaf springs 216A,B, spaced-apart in the X direction. The spacing D1 of adjacent ends 218A,B of the leaf springs 216A,B at their points of connection with the member 214 is larger than the spacing D2 of adjacent ends 220A,B the leaf springs 216A,B at their points of connection with the supporting member 212, such that the stylus supporting member 212, the member 214 and the leaf springs 216A,B form a trapezium. An elongate stylus 218 having a sensing tip 220 is supported on the stylus supporting member with axis A1 of the stylus supporting member 212 being co-planar with the axis A2 of the stylus 218. The configuration of the leaf springs 216A,B is such that if the stylus supporting member 212 is displaced from its rest position (FIG. 11B), it will undergo a rotation α about its axis A1. The magnitude of this rotation is related to the magnitude of the displacement of the supporting member 212 from its rest position.

Figure 12:
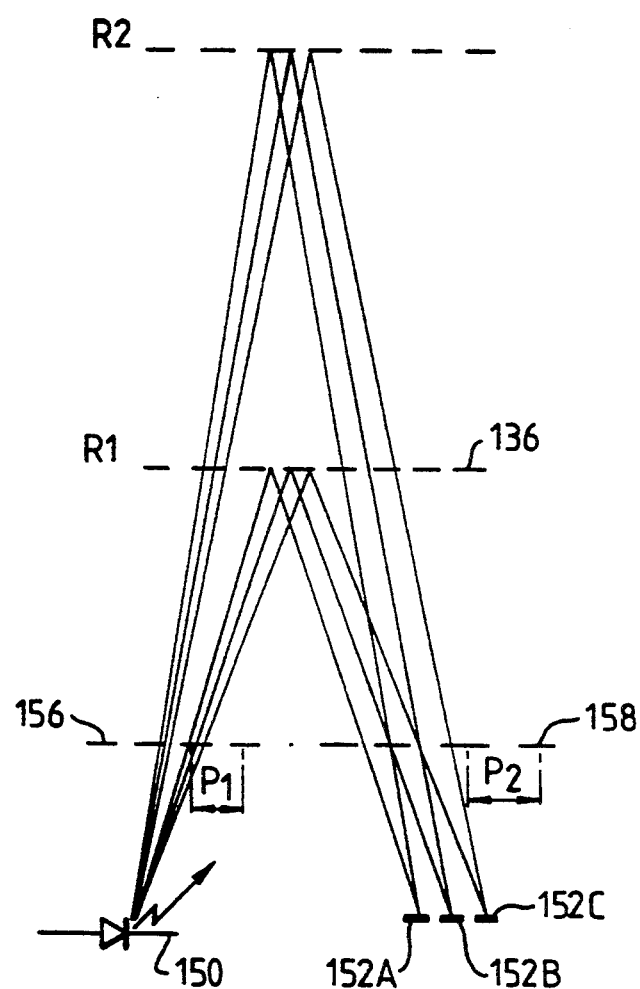
FIG. 12 is a ray tracing for FIG. 11.

Referring now to FIG. 12, the optical mechanism by which the scale and readhead transducers determine the magnitude and direction of the displacement of the cube 134 will now be described. As described in relation to FIG. 10, the readhead includes a light source 150 in register with an index grating 156, having a pitch $P_1$. Adjacent the light source 150 a detector unit 152 which includes three photosensitive detectors 152A,B,C is mounted in register with an analyser grating 158, having a pitch $P_2$. The index grating 156 and analyser grating 158 are provided on the same glass substrate, and light from the light source 150 passes through the index grating 156 and is reflected off a scale 136 to generate interference fringes, having a pitch $P_1$ in the plane of the analyser grating 158. Relative movement between the scale and the readhead in the X direction causes the fringes to move across the analyser grating 158 which effectively shutters the fringes for the photodetectors 152A,B,C. However, because the pitches of the fringes and the pitch of the analyser grating are slightly different, moiré fringes will be generated at the analyser grating 158, having a periodicity in the X-direction (i.e. the direction of spacing of the lines of the analyser grating 158). The generation of the moiré fringes is akin to the generation of a beat frequency, and thus the moiré fringes will have a pitch equal to $1/(1/P_1 - 1/P_2)$; significantly larger than the pitch of either of the gratings 156,158. The photodetectors 152A,B,C are spaced apart behind analyser 158 by approximately one third of the pitch of a moiré fringe. Upon relative movement of the scale 136 and readhead 144 each of the photodetectors 152A,B,C will generate a cyclically varying electrical signal corresponding to the light intensity modulation at the analyser grating, with the three detectors producing outputs having a phase shift of approximately 120°. These outputs may be combined to produce a pair of sinusoidally varying signals having a quadrature relationship, from which both the magnitude and direction of relative movement of the cube 134 and the fixed structure 110 in, for example, the X direction may be determined.

This arrangement of scale and readhead has significant advantages in conjunction with the probe of the present invention. Firstly, because the position of the scale 136 relative to the readhead may vary in the Y direction between the two positions indicated in FIG. 12 as R1 and R2, it is not possible to employ a more conventional arrangement in which three distinct analyser windows are provided, each having lines fractionally shifted relative to the adjacent analyser window, unless the photodetectors 152A,B,C are positioned directly behind the respective windows. This is because, due to the triangulation of the light from light source 150 to scale 136 and to analyser 158, the angle of incidence of the light through the analyser grating 158 will change with the distance between the scale 136 and the readhead. With individual analyser windows therefore, cross-talk between a given detector and light passing through the window in register with an adjacent detector may occur as the angle of incidence becomes more acute. Furthermore, because the configuration of leaf springs employed for the X and Y axes of the probe of the present invention introduces a small rotation into the movement of the stylus supporting member 112, the fringes will have a continually variable skew angle relative to the lines of the analyser grating 158. It is thus not possible to employ the classical moiré configuration where the lines of the analyser grating 158 are skewed relative to the lines of the scale in order to generate moiré fringes extending substantially perpendicular to the lines of the analyser grating 158, because the pitch of the moiré fringes would be too sensitive to variation as the skew angle varies.

Figure 13:
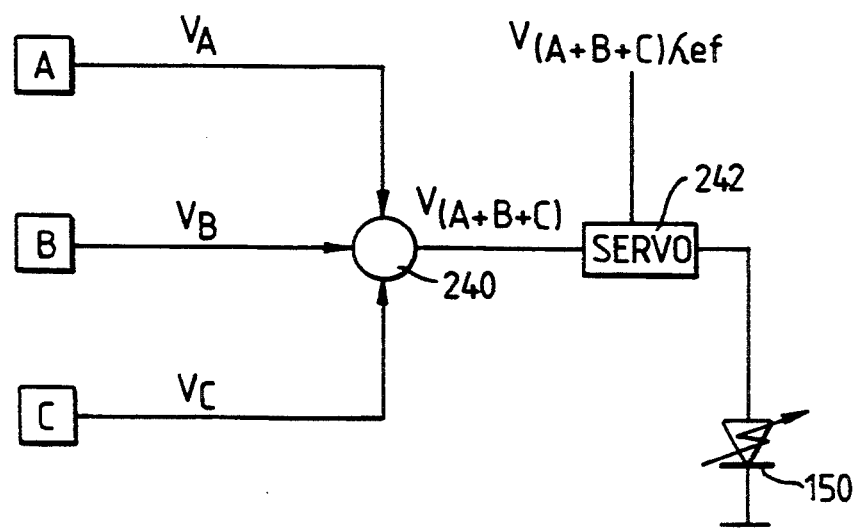
FIG. 13 is a circuit diagram for the detail of FIG. 11.

A further effect of the variation in offset between the scale 136 and the readhead is the resultant variation in the net intensity of light incident upon the photodetectors 152A,B,C. This results in a change in the magnitude of the quadrature signals, and thus requires an interpolator having a large dynamic range. To overcome this problem, the present invention provides a system which maintains a substantially constant D.C. intensity of light at the photodetectors 152A,B,C irrespective of the offset between the scale and the readhead. Referring now to FIG. 13, the detectors 152A,B,C each generate an output voltage $V_A, V_B, V_C$, and these are summed at a summing junction 240. The output of the summing junction is sent to a servo mechanism 242 which compares the output voltage from the circuit 240 with a reference voltage $V_{(A+B+C)ref}$, and passes an appropriate current through the LED 150 as a result. The LED is thus servoed such that the D.C. intensity of light at the analyser grating 158 is constant, and thus the amplitude of sinusoidal quadrature signals used to interpolate the position of the readhead relative to the scale likewise remains constant.

We claim:
1. An analogue probe for use on a coordinate positioning machine, the probe, including:
 a fixed structure by which the probe may be mounted to a movable arm of the machine;
 a stylus supporting member;
 means for supporting the stylus supporting member to enable displacement thereof relative to the fixed structure with three linear degrees of freedom; and
 first, second, and third transducers for measuring displacement of said supporting member relative to the fixed structure in each of three measuring directions corresponding to said three degrees of freedom, wherein each transducer comprises:
 a scale, provided on the stylus supporting member, having a series of spaced-apart lines extending transversely to the respective measuring direction;

a readhead, provided on the fixed structure and mounted in register with the scale, for reading said scale thereby to determine said displacement, wherein at least one of said scales is movable relative to the readhead in a direction transverse to both the lines of the scale and the measuring direction.

2. The probe according to claim 1, wherein each of said scales is movable relative to its corresponding readhead in a direction transverse to both the lines of the scale and the measuring direction.

3. The probe according to claim 2, wherein each readhead includes a light source and a grating for generating a periodic light pattern, and thereby a light intensity modulation upon relative movement of the scale and readhead in the measuring direction, and servoing means for maintaining a constant intensity of light based upon the distance between the scale and readhead in said direction transverse to both the lines of the scale and the measuring direction.

4. The probe according to claim 1, wherein each readhead includes:

a light source;

an index grating, positioned between the light source and the scale, light from said light source passing through said index grating and interacting with said scale to generate a periodic light pattern; and an analyzer grating, positioned in the plane of the periodic light pattern, the lines of the analyzer grating and the periodic light pattern interacting to generate moiré fringes, wherein said light source, said index grating and said analyzer grating are mounted on a housing having a spherical periphery and retained on said fixed structure by means for preventing translation thereof and for permitting rotation of said housing about three orthogonal axes intersecting at a common point coincident with the center of said spherical periphery.

* * * * *